United States Patent [19]

Levasseur

[11] 3,921,931

[45] Nov. 25, 1975

[54] VEHICLE SENSITIVE RETRACTOR WITH GAP IN BALL SENSING UNIT

[75] Inventor: Dornis Levasseur, Warren, Mich.

[73] Assignee: Allied Chemical Corporation, New York, N.Y.

[22] Filed: Oct. 25, 1973

[21] Appl. No.: 409,566

[52] U.S. Cl. .............................................. 242/107.4
[51] Int. Cl.² ................... A62B 35/02; B65H 75/48
[58] Field of Search .................. 242/107.4; 297/388; 280/150 SB

[56] References Cited
UNITED STATES PATENTS

| | | | |
|---|---|---|---|
| 3,430,891 | 3/1969 | Burleigh | 242/107.4 |
| 3,741,494 | 6/1973 | Fiala | 242/107.4 |
| 3,758,044 | 9/1973 | Nilsson | 242/107.4 |
| 3,770,224 | 11/1973 | Hayashi | 242/107.4 |
| 3,790,098 | 2/1974 | Lewis | 242/107.4 |

Primary Examiner—John W. Huckert
Assistant Examiner—John M. Jillions
Attorney, Agent, or Firm—John P. Kirby, Jr.

[57] ABSTRACT

The locking mechanism is operated by inertia and prevents withdrawal of a vehicle safety seat belt from its retractor when the locking mechanism is subjected to a predetermined acceleration or deceleration or a sudden change in direction of movement. The locking mechanism is vehicle sensitive and uses an inertia member, such as a sphere, disposed on a retaining base. A substantially conical member is disposed over and spaced apart from the inertia member. A locking dog is affixed to the substantially conical member. The inertia member is adapted to be disposed in a rest position in the approximate center of the retaining base and is adapted to be displaced from the rest position by inertia to an engaged position at the periphery of the retaining base. Sufficient impact of the inertia member against the substantially conical member causes the locking dog to engage a ratchet wheel connected to the safety belt spool to restrain the safety belt against withdrawal.

8 Claims, 7 Drawing Figures

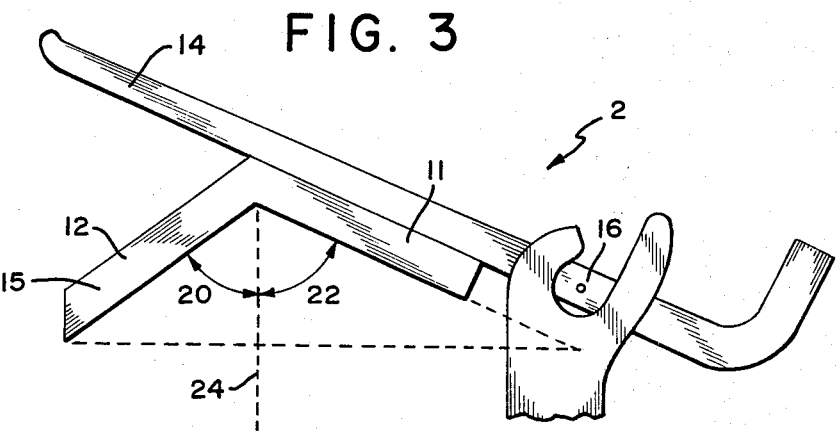
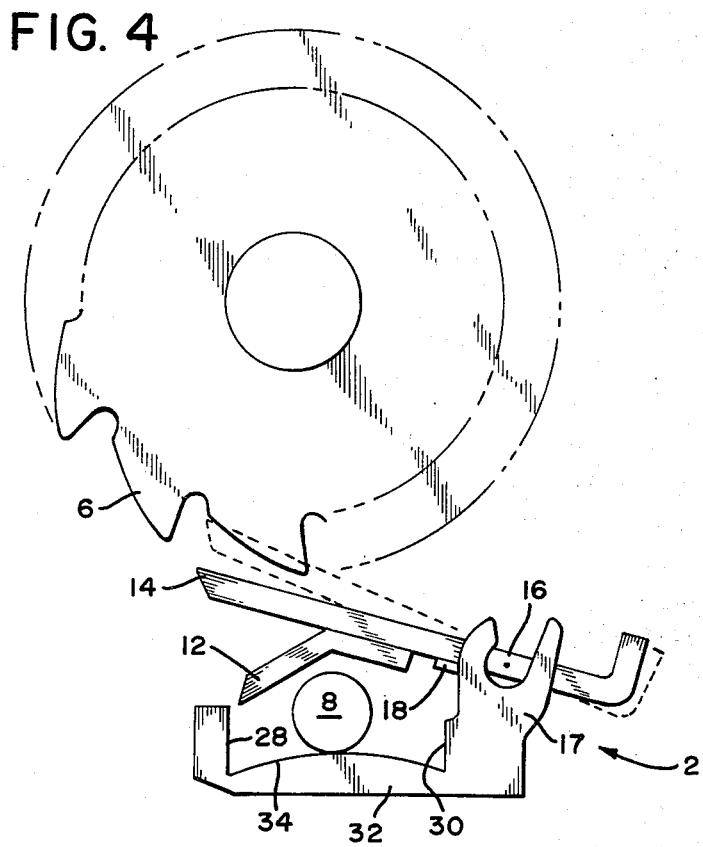
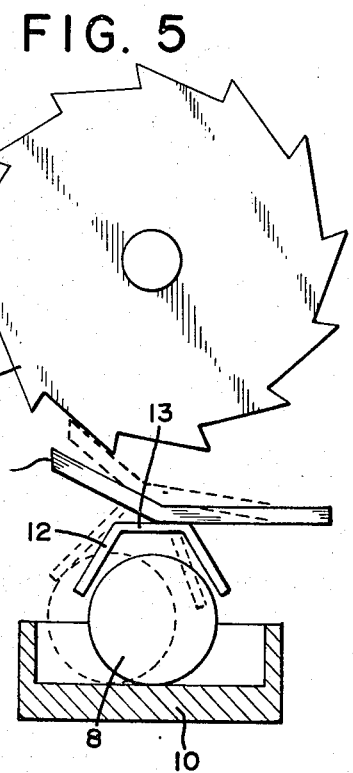
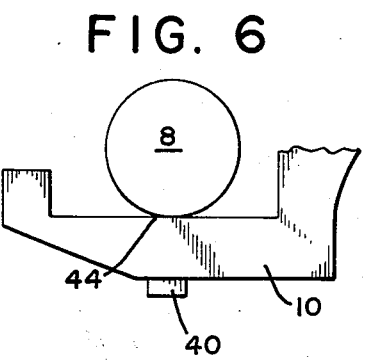
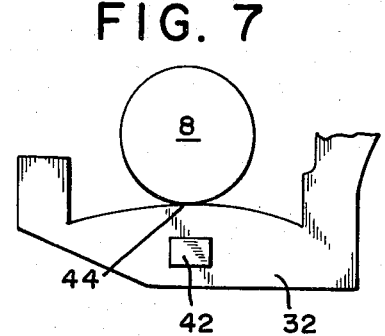

VEHICLE SENSITIVE RETRACTOR WITH GAP IN BALL SENSING UNIT

BACKGROUND OF THE INVENTION

This invention relates to safety belts, such as those adapted for use in vehicles, such as an automobile. More particularly, this invention relates to an improved locking mechanism for the retractor mechanism of such a safety belt. The locking mechanism is adapted to be placed in operation automatically when a dangerous situation arises, such as a collision. Still more particularly, this invention relates to an improved locking mechanism operated by inertia and adapted to lock the withdrawal mechanism of the safety belt when the locking mechanism is subjected to a prdetermined deceleration or acceleration or to a sudden change in the direction of movement, such as occurs in dangerous situations, such as a collision.

Recently designed automobile safety seat belts are normally wound on a spool and are equipped with a retractor mechanism. When the seat belt is in use under normal conditions, not under emergency conditions, it is possible for the seat belt wearer to move in his seat, for example, to lean forward. As the wearer leans forward, the belt is unwound from the spool, and as the wearer leans back, the belt is retracted and rewound on the spool. But, in an emergency, it is desirable to lock the spool so that it will not allow the belt to be unwound, but, rather, will hold the wearer firmly in his seat.

Other locking mechanisms for a safety belt are known in the prior art, including locking mechanisms operated by inertia, such as the locking mechanism disclosed in U.S. patent application No. 382,971 of P. O. Weman, filed July 26, 1973, of which this invention is an improvement. Additional locking mechanisms are disclosed in U.S. Pat. Nos. 3,741,494 to Fiala; 3,237,729 to Proctor; 3,430,891 to Burleigh; 3,343,763 to Spouge and 3,343,765 to Baker; all of which disclose mono-stable mechanisms. Another patent of interest is U.S. Pat. No. 1,044,228 to Myers.

SUMMARY OF THE INVENTION

The locking mechanism of this invention comprises: an inertia member adapted to be disposed in a rest position when the locking mechanism is inoperative and adapted to be displaced from the rest position by inertia; a retaining base for this inertia member on which the inertia member is supported; a substantially conical member disposed above the inertia member, centered over the rest position of the inertia member, and spaced apart from the inertia member when the inertia member is in its rest position; and a locking dog affixed to the substantially conical member, whereby displacement of the inertia member from the rest position and impact of the inertia member against the substantially conical member cause the locking dog to engage the ratchet wheel which is mounted on the spool and thus restrains the safety belt against movement in the withdrawal direction. The substantially conical member is slightly tilted. In one embodiment of this invention, the retaining base has a substantially flat upper surface. In a second embodiment of this invention, the retaining base has a slightly convex upper surface. In a third embodiment of this invention, a magnetic material is positioned in the center portion of the retaining base and the inertia member is composed of a magnetic material. The magnetic force of the magnetic material is large enough to hold the inertia member in the central position prior to actuation of the locking mechanism. The retaining base may have a shallow recess at its center adapted to hold the inertia member in a rest position prior to actuation.

DESCRIPTION OF THE DRAWINGS

FIG. 3 is an enlarged schematic illustration of a portion of the locking mechanism shown in FIG. 1.

FIG. 4 is a schematic illustration of an alternate embodiment of the locking mechanism.

FIG. 5 is a schematic illustration of another alternate embodiment of the locking mechanism.

FIG. 6 is a schematic illustration of a portion of the locking mechanism showing another alternate embodiment.

FIG. 7 is a schematic illustration of a portion of the locking mechanism showing another alternate embodiment.

DETAILED DESCRIPTION

Figure 1:
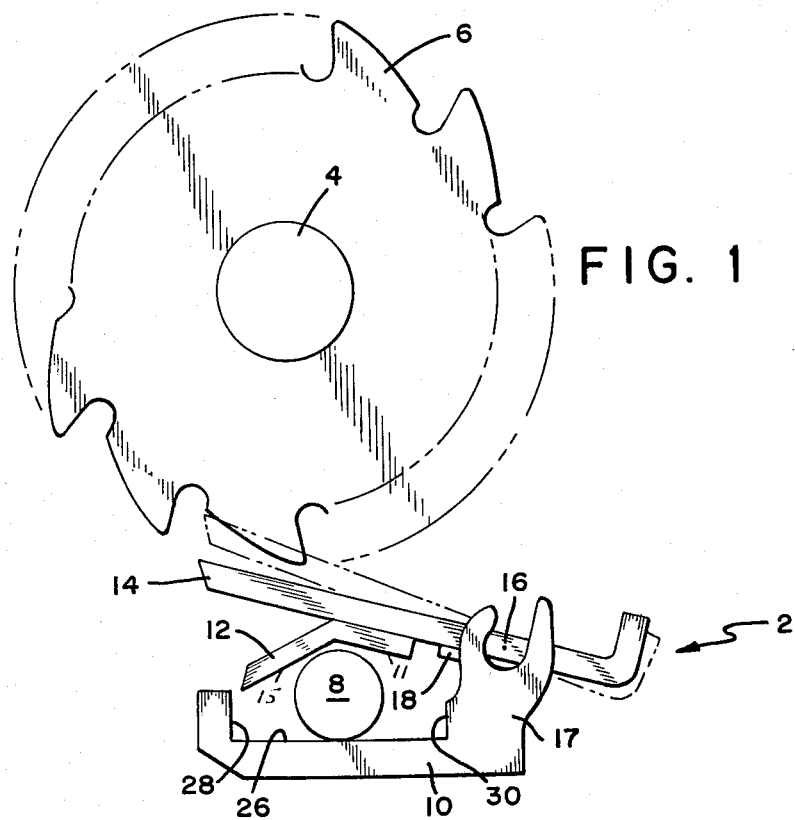
FIG. 1 is a schematic illustration of the locking mechanism of this invention in its rest position.

Referring to FIG. 1, the locking mechanism of this invention is generally indicated by the numeral 2 and is adapted for use with one or more safety belts, such as those used in automobiles and other vehicles. The locking mechanism 2 is adapted for use with safety belts of the type which are wound around a spool 4. The spool has one or more ratchet wheels 6 which may be axially mounted on the spool 4 as part of the retractor mechanism. A safety belt having such a spool and ratchet wheel mechanism is described in U.S. Pat. No. 3,343,765 to A. R. Baker and in U.S. Pat. No. 3,226,053 to J. W. L. Petty. The locking mechanism 2 comprises: an inertia member 8 adapted to be disposed in a rest position, as shown in FIG. 1, when the locking mechanism 2 is inoperative and adapted to be displaced from this rest position by inertia, as shown in FIG. 2; a retaining base 10 for the inertia member 8, the inertia member 8 being supported on the retaining base 10; a substantially conical member 12 having an open bottom disposed above the inertia member 8, spaced apart from the top of the inertia member 8 when the inertia member 8 is in its rest position and centered over the rest position of the inertia member 8, as illustrated in FIG. 1; and a locking dog 14 affixed to the substantially conical member 12, whereby displacement of the inertia member 8 from the rest position, as shown in FIG. 1, and impact of the inertia member 8 against the substantially conical member 12 cause the locking dog 14 to engage the ratchet wheel 6, as shown in FIG. 2, to restrain the safety belt against movement in the withdrawal direction.

Figure 2:
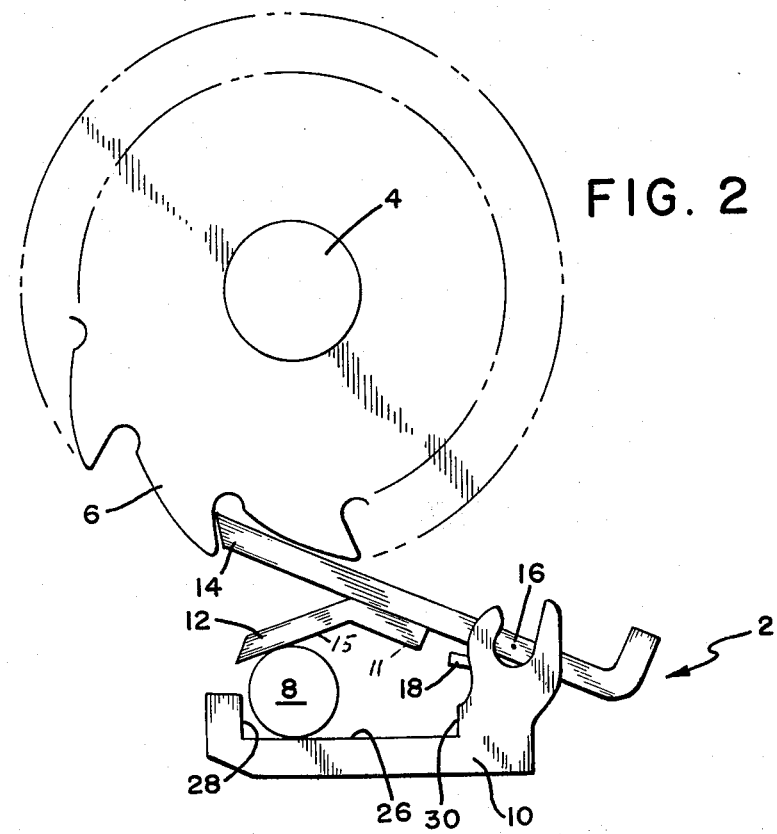
FIG. 2 is a schematic illustration of the locking mechanism shown in FIG. 1, but in FIG. 2 the locking mechanism is shown in its engaged position.

The locking mechanism 2 has two substantially stable positions, a rest position, when the inertia member 8 is located in the approximate center of the retaining base 10, which is illustrated in FIG. 1, and an engaged position, when the inertia member 8 is located at the periphery of the retaining base 10, as illustrated in FIG. 2. The locking mechanism 2 is vehicle sensitive because when the vehicle in which the locking mechanism 2 is positioned is subjected to a sudden acceleration or deceleration or change in direction of movement of a predetermined magnitude, the locking mechanism 2 will be actuated. The inertia member 8 will move from its approximate center position, shown in FIG. 1, to the outer periphery of the retaining base 10, shown in FIG. 2, causing locking dog 14 to engage ratchet wheel 6. In order to actuate the locking mechanism 2, the impact of the inertia member 8 against the inside surface of the substantially conical member 12 must be large enough to move the substantially conical member 12. The two substantially stable positions, the rest position when the inertia member 8 is located in the approximate center of the retaining base 10 and engaged position when the inertia member is located at the periphery of the retaining base 10, provide a binary effect. The inertia member 8 returns to the rest position, in the approximate center of the retaining base 10, as a result of the weight of the substantially conical member 12 and the locking dog 14 on the inertia member 8.

The space or gap between the substantially conical member 12 and the top of the inertia member 8 when the member 12 is in its rest position is of the order of a fraction of an inch. In order to actuate the locking mechanism 2, the inertia member 8 must not only be displaced from its rest position and come into contact with the substantially conical member 12 but must come into contact with the substantially conical member 12 with sufficient force to move the substantially conical member 12. This provides the positive advantage of sensing the effect of small accelerations, decelerations and small lateral movements of the vehicle so that such small accelerations decelerations and lateral movements actuate the locking mechanism 2. Thus, an important feature of this locking mechanism 2 is the space between the inertia member 8 and the substantially conical member 12 when the substantially conical member 12 is in its rest position. The significance of this feature is that the locking mechanism 2 of this invention has dynamic sensitivity, but the static sensitivity or static lock-up angle is not substantially changed. This locking mechanism 2 is sensitive to the comparatively small accelerations, decelerations and lateral movements of the vehicle, but is not actuated when the vehicle is parked on an incline such as a hill or driveway.

The inertia member 8 may be substantially spherical and will move in a direction opposite to that of the vehicle. If the vehicle accelerates, the inertia member 8 will move in a direction toward the back of the vehicle. If the vehicle turns to the right, the inertia member 8 will move to the left. If the vehicle turns to the left, the inertia member 8 will move to the right.

Movement of the inertia member 8 from its center position, shown in FIG. 1, to the outer periphery of the retaining base 10, shown in FIG. 2, causes one side of the substantially conical member 12 to move upward and, as a result, causes the locking dog 14 to move upward. The locking dog 14 pivots on pivot point 16. Upward movement of the locking dog 14, causes the locking dog 14 to engage an outer ratchet tooth of ratchet wheel 6. In FIGS. 1 and 2, the counterclockwise direction of the ratchet wheel 6 is in the direction in which the ratchet wheel turns when the safety belt is being withdrawn. Referring to FIGS. 1 and 2, the locking dog 14 engages the ratchet wheel 6 at one end of the locking dog 14. The locking dog 14 has a pivot point 16 at the opposite end of the locking dog 14 from the end which engages the ratchet wheel 6. The pivot point 16 is part of a support member 17 which may be connected to retaining base 10.

Referring to FIG. 3, the substantially conical member 12 has a slight tilt in reference to vertical plane 24 for the purpose of providing uniform sensitivity for the engaging action of the locking dog 14 to the ratchet wheel 6. This slight tilt is defined by angles 20 and 22. The angle 22 is formed by the side 11 of the substantially conical member 12 adjacent to the end of the locking dog 14 having pivot point 16 with the vertical plane 24. The angle 20 is formed by the side 15 of the substantially conical member 12 adjacent the end of the locking dog 14 which engages the ratchet wheel 6 with the vertical plane 24. Angle 22 is greater than angle 20 because of the tilt of the substantially conical member 12 about its apex with reference to the vertical plane 24. Angle 20 may be an angle in the range of from 56° to 59°, such as 57.5°. Angle 22 may be an angle in the range of from 61° to 64°, such as 62.5°. These angles vary with the geometry of the system, that is, the relationship of the pivot point 16 of the locking dog 14 to the location and size of the inertia member 8.

Optionally, the side 11 of the substantially conical member 12 adjacent to the end of the locking dog 14 having pivot point 16 may be slightly shorter than the side 15 of the substantially conical member 12 adjacent to the end of the locking dog 14 which engages the ratchet wheel 6, as shown in FIGS. 1 and 2.

Referring to FIGS. 1 and 2, in the first and preferred embodiment of this invention, the retaining base 10 has a substantially flat upper surface 26 disposed in an approximately horizontal position and has upturned edges 28 and 30 at the outer periphery of the retaining base 10.

Referring to FIG. 1, the support member 17 has a stop 18 mounted thereon and adapted to maintain the locking dog 14 at a height sufficient to provide a space between the conical member 12 and the inertia member 8. The stop 18 prevents the end of the locking dog which engages the ratchet wheel 6 from rotating about pivot point 16 too far in a downward direction. Referring to FIG. 2, when the inertia member 8 moves against the substantially conical member 12 with sufficient force to actuate the locking dog 14, the locking dog 14 is lifted above stop 18.

Referring to FIG. 4, a second embodiment of this invention has a retaining base 32 which has a slightly convex upper surface disposed in an approximately horizontal position and has upturned edges 28 and 30 at the outer periphery of the base 32. The slightly convex upper surface 34 accentuates the positive locking action of this locking mechanism 2. Once the inertia member 8 starts to move away from the approximate center of retaining base 32, the displacement is amplified somewhat by the convex shape of the surface 34. This produces a binary effect in which the inertia member 8 has two substantially stable positions, a rest position when the inertia member 8 is located in the approximate center of the retaining base 32 and engaged position when the inertia member is located at the periphery of the retaining base 32. As a result of this design, illustrated in FIG. 4, the movement of the locking mechanism 2 from the rest position to the engaged position is more rapid than when the upper surface 34 is flat.

Referring to FIG. 5, the substantially conical member 12 may optionally have a substantially flat portion 13 in place of an apex, whereby the member 12 approaches the shape of an inverted cup. Thus, the description "substantially conical" as applied to member 12 encompasses both true cones having an apex and modified cones, such as a cone having no apex but instead having a substantially flat portion in place of the apex. The locking dog 14 may be bent as shown in FIG. 5 or straight as shown in FIGS. 1–4.

Referring to FIGS. 1, 2, 4 and 5, the inertia member 8 has a certain amount of freedom of movement within its rest position. The member 8 is confined within the area of its rest position by the interior surfaces of the substantially conical member 12. Slight movements of the inertia member 8 within the area of its rest position and mere contact with the interior sides of member 12 are not enough to actuate the locking mechanism 2, unless and until there is sufficient impact.

Referring to FIG. 6, the third embodiment of this invention has a magnet or a magnetic material 40 located at the center of the retaining base 10, shown in FIG. 1, or the retaining base 32, and located on the underside of the retaining base, as shown in FIG. 6. The magnetic force of the magnet or the magnetic material 40 is large enough to hold the inertia member 8 in the central position of the retaining base 10 prior to actuation of the locking mechanism 2 and small enough to be overcome by an accelerating or decelerating force. For this embodiment, the inertia member 8 is composed of a magnetic material.

Referring to FIG. 7, the magnet or a magnetic material 42 is located at the center of the retaining base 32, shown in FIG. 4, or the retaining base 10, shown in FIG. 1, and the magnetic material 40 or 42 is imbedded within the retaining base 32. Such a magnet or magnetic material 40 or 42 may be used with the embodiment of FIG. 1 having a substantially flat upper surface or the embodiment of FIG. 4 having a slightly convex upper surface. The magnet 40 or 42 further establishes a stable position for the inertia member 8 at the center of a retaining base 10 and 32.

Referring to FIGS. 6 and 7, the upper surface of the retaining base 10 may optionally have a shallow recess 44 at the center of the retaining base 10 into which the inertia member 8 fits while in rest position. The recess 44 is shallow enough so that the inertia member 8 may be displaced out of the recess 44 upon acceleration or deceleration. In the embodiment shown in FIGS. 6 and 7, the inertia member 8 has less freedom of movement within its rest position, than in the embodiments illustrated in FIGS. 1–5.

I claim:

1. A locking mechanism operated by inertia and adapted for use with one or more safety belts of the type wherein the safety belt is wound around a spool, said spool having a ratchet wheel, said locking mechanism comprising:
   an inertia member adapted to be disposed in a rest position when said locking mechanism is inoperative and adapted to be displaced from said rest position by inertia;
   a retaining base for said inertia member, said inertia member being supported on said retaining base;
   a substantially conical actuation member having an open bottom, sides and a top, said actuation member disposed above said inertia member and centered over said rest position of said inertia member, means for spacing apart said actuation member from said inertia member when said inertia member is in said rest position, said actuation member movable by said inertia member; and
   a locking dog affixed to said actuation member, whereby displacement of said inertia member from said rest position causes said locking dog to engage said ratchet wheel to restrain said safety belt against movement in the withdrawal direction; wherein:
   at least a portion of said inertia member extends into said open bottom of said actuation member, a portion of said sides of said actuation member extending at least partially over and around at least a portion of said inertia member;
   said locking dog engages said ratchet wheel at one end of said locking dog and said locking dog has a pivot point at the opposite end of said locking dog from the end which engages said ratchet wheel, said actuation member affixed between said ends of said locking dog;
   said actuation member is slightly tilted, thereby providing uniform sensitivity to the engaging action of the locking dog to the ratchet wheel; and the angle formed by the side of said actuation member adjacent the end of said locking dog having said pivot point with a vertical plane through the top of said actuation member being greater than the angle formed by the side of said actuation member adjacent the end of said locking dog which engages said ratchet wheel with the vertical plane.

2. A locking mechanism according to claim 1 wherein said retaining base has a substantially flat upper surface disposed in a substantially horizontal position and has upturned edges at the outer periphery of said base.

3. A locking mechanism according to claim 1 wherein said retaining base has a slightly convex upper surface disposed in a substantially horizontal position and has upturned edges at the outer periphery of said base.

4. A locking mechanism according to claim 1 and further comprising a magnet located at the center of said base, the magnetic force of which is large enough to hold said inertia member in the central position of said base prior to actuation of said locking mechanism; and wherein said inertia member is composed of a magnetic material.

5. A locking mechanism according to claim 1 wherein said retaining base has an upper surface and said upper surface has a shallow recess at the center of said retaining base adapted to hold said inertia member in said rest position and adapted to allow said inertia member to be displaced out of said recess by inertia.

6. The locking mechanism according to claim 1 wherein said means for spacing apart said actuation member from said inertia member comprises: a support member connected to said retaining base, said support member having a stop adapted to maintain said locking dog at a height sufficient to provide a space between said substantially conical member and said inertia member when said inertia member is in said rest position.

7. A locking mechanism according to claim 1 wherein said actuation member has a flattened portion at its top.

8. A locking mechanism according to claim 1 wherein the side of the actuation member adjacent to the end of the locking dog having the pivot point is slightly shorter than the side of the actuation member adjacent to the end of the locking dog which engages the ratchet wheel.

* * * * *